United States Patent
Katayama (10) Patent No.: US 10,534,574 B2
(45) Date of Patent: Jan. 14, 2020

(54) ACOUSTIC SYSTEM AND VOLUME ADJUSTMENT METHOD

(71) Applicant: HONDA MOTOR CO., LTD., Tokyo (JP)

(72) Inventor: Mutsumi Katayama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/110,274

(22) Filed: Aug. 23, 2018

(65) Prior Publication Data

US 2019/0065137 A1    Feb. 28, 2019

(30) Foreign Application Priority Data

Aug. 29, 2017  (JP) ................. 2017-164746

(51) Int. Cl.
| | |
|---|---|
| *G06F 3/16* | (2006.01) |
| *H04R 29/00* | (2006.01) |
| *H04R 3/12* | (2006.01) |
| *H04R 5/04* | (2006.01) |

(52) U.S. Cl.
CPC ............ *G06F 3/165* (2013.01); *H04R 3/12* (2013.01); *H04R 5/04* (2013.01); *H04R 29/001* (2013.01); *H04R 2430/01* (2013.01); *H04R 2499/13* (2013.01)

(58) Field of Classification Search
USPC ........ 381/55, 56, 57, 58, 61, 104, 317, 71.1, 381/71.14
See application file for complete search history.

(56) References Cited

U.S. PATENT DOCUMENTS

2002/0031236 A1*  3/2002 Shimizu .............. H04R 3/00
                                                            381/104

FOREIGN PATENT DOCUMENTS

| JP | 2001-28524 A | 1/2001 |
|---|---|---|
| JP | 2004-320582 A | 11/2004 |
| JP | 2006-184423 A | 7/2006 |

(Continued)

OTHER PUBLICATIONS

Office Action dated Apr. 9, 2019, issued in counterpart JP Application No. 2017-164746, with English machine translation. (6 pages).

(Continued)

*Primary Examiner* — Yosef K Laekemariam
(74) *Attorney, Agent, or Firm* — Westerman, Hattori, Daniels & Adrian, LLP (57) ABSTRACT

An acoustic system comprises an operation condition determination part for determining an operation condition of an operating element for controlling sound volume of a sound reproduction device which reproduces sounds from a plurality of sound sources, and a control part for changing a control object of the sound volume by the operating element in accordance with the sound source which is reproduced by the sound reproduction device, based on the operation condition determined by the operation condition determination part. The control part prohibits switching of the control object of the sound volume by operation of the operating element even when the sound source to be reproduced has been changed while it is determined by the operation condition determination part that the operation of the operating element is continuously performed.

6 Claims, 6 Drawing Sheets

(56) References Cited

FOREIGN PATENT DOCUMENTS

| JP | 2006-260649 A | | 9/2006 | |
|---|---|---|---|---|
| JP | 2011149852 | * | 4/2011 | ............. G01C 21/36 |
| JP | 2011-149852 A | | 8/2011 | |
| JP | 2012-70155 A | | 4/2012 | |

OTHER PUBLICATIONS

Office Action dated Jun. 25, 2019, issued in counterpart JP Application No. 2017-164746, withEnglish translation. (10 pages).
Office Action dated Sep. 3, 2019, issued in counterpart JP application No. 2017-164746, with English translation. (10 pages).

* cited by examiner

ACOUSTIC SYSTEM AND VOLUME ADJUSTMENT METHOD

CROSS-REFERENCE OF RELATED APPLICATION

This application claims priority of Japanese Patent Application No. 2017-164746 filed in Japan on Aug. 29, 2017, the entire contents of which are incorporated herein by reference.

TECHNICAL FIELD

The present invention relates to an acoustic system and a volume adjustment method.

BACKGROUND OF THE INVENTION

Hitherto, there is disclosed a device in which, when audio is reproduced, an object of adjustment operation is switched to volume of a guide sound at the time the guide sound is outputted during the adjustment operation of the reproduction volume (for example, see Japanese Patent Application Laid-Open Publication No. 2011-149852).

In the device disclosed in Japanese Patent Application Laid-Open Publication No. 2011-149852, the switching of the object of the adjustment operation is not necessarily performed at appropriate timing, and there may be cases where control different from the intention of an operator is performed.

Taking into consideration the above referred circumstances, there is a need of providing an acoustic system and a volume adjustment method in which the operation intended by an operator can be performed.

SUMMARY OF INVENTION (1) In one aspect of the present invention, an acoustic system comprises an operation condition determination part (an operation condition determinator) for determining an operation condition of an operating element operable by an operator for controlling sound volume of a sound reproduction device which reproduces sounds from a plurality of sound sources (i.e., sound volume control performed via the operation element operable by the operator, which is to be applied to any one of the sounds in a controlled manner), and a control part (a controller) for changing a control object of the sound volume by the operating element, thereby applying the sound volume control to any one of the reproduced sounds, in accordance with the sound source which is reproduced by the sound reproduction device, based on the operation condition determined by the operation condition determination part, wherein the control part prohibits switching of the control object of the sound volume control by the operating element between the sounds reproduced at the same time even when the sound source to be reproduced has been changed while it is determined by the operation condition determination part that the operation of the operating element is continuously performed.

(2) In the above item (1), the sound source includes a sound of predetermined media (a media player with sound contents stored therein) and a guide sound (a guiding message such as voice message or instruction, for example, "an interrupt sound" in an embodiment) by a predetermined apparatus (a guiding message player), and the control part places priority on the guide sound as the control object in the case where it is determined by the operation condition determination part that the operation of the operating element has been started in a condition where the sound of the media and the guide sound are reproduced concurrently, and places priority as the control object on the sound which is reproduced, in the case where it is determined by the operation condition determination part that the operation of the operating element has been started in a condition where only the sound of the media or only the guide sound is reproduced.

(3) In the above item (1) or (2), the control part determines that the operation of the operating element is continued until a first predetermined time elapses after the operation of the operating element has been stopped, and so determined by the operation condition determination part.

(4) In any one of the above items (1) to (3), the sound source includes the sound of the predetermined media and the guide sound by the predetermined apparatus, and the control part prohibits the control of the volume with respect to the guide sound and the sound of the media until a second predetermined time elapses after the guide sound ends in the case where it is determined by the operation condition determination part that the operation of the operating element has been started during the reproduction of the guide sound and it is determined that the guide sound has ended while the operation of the operating element is continuously performed, and cancels prohibition of the switching of the control object when the second predetermined time has elapsed after the end of the guide sound, even when it is determined by the operation condition determination part that the operation of the operating element is not stopped.

(5) In the above item (2), the control part puts output of the guide sound on standby while it is determined by the operation condition determination part that the operation of the operating element is continuously performed, in the case where it is determined that interrupt/insertion of the guide sound has been generated during controlling the volume of the sound of the media.

(6) In the above item (5), the control part selects whether or not to put the guide sound on standby in accordance with a degree of priority of the generated guide sound.

(7) In a volume adjustment method, a computer determines an operation condition of an operating element for controlling sound volume of a sound reproduction device which reproduces sounds from a plurality of sound sources, changes a control object of the sound volume by the operating element in accordance with the sound source which is reproduced by the sound reproduction device, based on the determined operation condition, and prohibits switching of the control object of the sound volume by operation of the operating element even when the sound source to be reproduced has been changed while it is determined that the operation of the operating element is continuously performed.

EFFECT OF THE INVENTION

According to the above item (1) or (2) or (7), since the switching of the control object of the sound volume by the operation of the operating element is prohibited even when the sound source to be reproduced has been changed while it is determined that the operation of the operating element is continuously performed, the operation intended by the operator can be performed.

According to the above item (3), the adjustment of the sound volume intended by the operator can be performed more accurately. For example, in the case where the operating element is a push type button or the like, there may be cases where a button pushing condition is continued even when it is not intended by the operator. However, even in such a case, the adjustment of the sound volume intended by the operator can be performed more accurately.

According to the above item (4), the control of the volume with respect to the sound is prohibited until the second predetermined time elapses, and the prohibition of the switching of the control object is cancelled after the second predetermined time has elapsed. Therefore, the adjustment of the sound volume intended by the operator can be performed while reducing the adjustment of the sound volume which is not intended by the operator.

According to the above item (5), the operator can listen to the guide sound at the appropriate timing by putting the output of the guide sound on standby.

According to the above item (6), the guide sound with high priority is outputted preferentially as compared with the guide sound with low priority, and the guide sound with low priority is controlled so as to remain on standby. Therefore, the operator can listen to the guide sound at the more appropriate timing.

DETAILED DESCRIPTION OF EMBODIMENTS OF THE INVENTION

Hereinafter, embodiments of an acoustic system and a sound adjustment method of the present invention will be explained with reference to accompanying drawings.
<First Embodiment>

Figure 1:
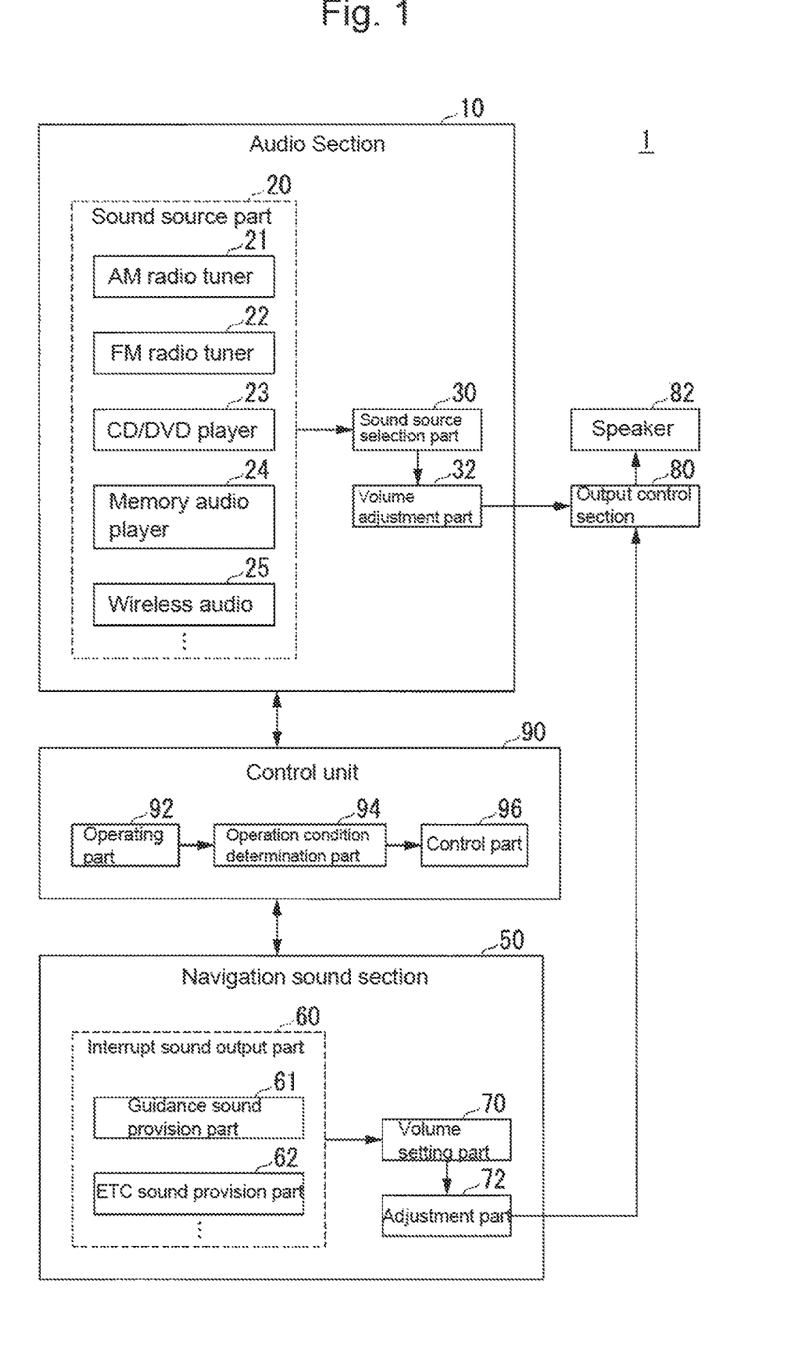
FIG. 1 is a diagram showing a functional configuration of an acoustic system 1.

FIG. 1 is a diagram showing a functional configuration of an acoustic system 1. The acoustic system 1 is mounted on a vehicle and provides an occupant with a sound based on the operation of the occupant and a condition of the vehicle. The vehicle includes a two-wheeled vehicle, a three-wheeled vehicle, a four-wheeled vehicle and the like.

The acoustic system 1 is provided with an audio section 10, a navigation sound section 50, an output control section 80, a speaker 82 and a control unit 90, for example.
[Audio Section]

The audio section 10 is provided with a sound source part 20, a sound source selection part 30 and a sound volume adjustment part 32, for example. The sound source part 20 includes an AM radio tuner 21, an FM radio tuner 22, a CD/DVD player 23, a memory audio player 24 and wireless audio 25, for example. The sound source part 20 may be provided with other tuner and player in addition to (or instead of) each of the above-referred tuners and players.

The AM radio tuner 21 receives broadcasting in a frequency band of the AM radio and outputs a content of the received broadcasting to the sound source selection part 30, for example. The FM radio tuner 22 receives broadcasting in a frequency band of the FM radio and outputs a content of the received broadcasting to the sound source selection part 30, for example. The CD/DVD player 23 reads contents stored in a CD or a DVD inserted in the CD/DVD player 23 and outputs data of the read contents to the sound source selection part 30, for example.

The memory audio player 24 communicates with memory audio through an electric wiring connected to a communication interface provided in the vehicle, for example. The memory audio player 24 acquires the data outputted by the memory audio and outputs the acquired data to the sound source selection part 30.

The wireless audio 25 communicates with a portable terminal device such as a predetermined smart phone, a music reproducing device and the like by using a short-distance wireless communication, for example. The short-distance wireless communication is communication which uses a wireless communication standard such as Bluetooth (registered trademark). The wireless audio 25 acquires data outputted by the portable terminal device through the short-distance wireless communication and outputs the acquired data to the sound source selection part 30.

The sound source selection part 30 selects a sound source which has been selected by the operation of the occupant with respect to an operating part 92 of the control unit 90, from sound sources outputted by the sound source part 20. The volume adjustment part 32 sets sound volume of the sound source selected by the sound source selection part 30, in accordance with the operation of the occupant with respect to the operating part 92 and outputs data of the set sound source to the output control section 80. Hereinafter, the sound outputted to the audio section 10 will be referred to as "media sound".

The navigation sound section 50 is provided with an interrupt sound output part 60, a sound volume setting part 70 and an adjustment part 72, for example.

The interrupt sound output part 60 is provided with a guidance sound provision part 61 and an ETC (Electronic Toll Collection system) sound provision part 62, for example. The interrupt sound output part 60 allows the speaker 82 to output a predetermined sound, based on the control of the control unit 90. Herein, the interrupt sound output part 60 may be provided with other sound provision part in addition to (or instead of) the above-referred guidance sound provision part 61 or the ETC sound provision part 62. The other sound provision part is a sound provision part which provides a sound indicating advice about safety drive support, for example.

The guidance sound provision part 61 outputs a predetermined guidance sound to the output control section 80 based on an instruction of a navigation device (not shown) which is mounted on the vehicle. The predetermined guidance sound is a sound which shows the occupant of the vehicle a route to a destination, for example.

The ETC sound provision part 62 outputs a predetermined ETC sound to the output control section 80 based on an instruction of an on-board ETC apparatus (not shown) which is mounted on the vehicle. The predetermined ETC sound is a sound which communicates a usage charge to the occupant of the vehicle, for example.

The sound volume setting part 70 sets the volume of the sound outputted by the interrupt sound output part 60, in accordance with the operation of the occupant with respect to the operating part 92. The adjustment part 72 outputs data of the sound which is outputted by the interrupt sound output part 60 and whose sound volume is set by the volume setting part 70, to the output control section 80. Hereinafter, a guide sound outputted to the navigation sound section 50 will be referred to as "interrupt sound".

Herein, the interrupt sound is not limited to the above-referred guidance sound and ETC sound and may be a sound which is acquired by communication with other vehicle and outputted in an own vehicle or a sound which is outputted to artificial intelligence (AI).

The output control section 80 acquires the data outputted by the audio section 10 or the navigation sound section 50 and allows the speaker 82 to output the acquired data. The output control section 80 allows the speaker 82 to output a sound corresponding to the data, for example, at sound volume set with respect to the acquired data. The speaker 82 outputs the sound based on the control of the output control section 80.

[Control Unit]

The control unit 90 is provided with the operating part 92, an operation condition determination part 94 and a control part 96, for example. The operating part 92 includes a selection part which allows the occupant to select the sound source to be outputted to the speaker 82, from the sound sources of the sound source part 20, an adjustment part for adjusting the volume of the sound outputted from the speaker 82, and the like. The adjustment part for adjusting the volume of the sound may be an adjustment knob which adjusts the sound volume by rotation or a push type button. Further, the operating part 92 may be a touch panel. The following explanation will be made on the assumption that the adjustment of the sound volume will be performed by rotating "the adjustment knob".

The operation condition determination part 94 detects a condition of the operation with respect to the operating part 92, for example. The condition of the operation is whether the adjustment of sound volume is performed, a degree of adjustment of the sound volume, and the like, for example.

The control part 96 controls a classification of the sound and the volume of sound to be outputted by the speaker 82, based on the sound source selected by the operation with respect to the operating part 92. Further, the control part 96 changes a control object of the sound volume by the operating part 92 in accordance with the sound source which is reproduced by the audio section 10 or the navigation sound section 50, based on the operation condition acquired by the operation condition determination part 94.

In the case where it is determined by the operation condition determination part 94 that the operation of the adjustment knob has been started in a condition where the sound of the media and the interrupt sound are reproduced concurrently, the control part 96 places priority on the interrupt sound as the control object. Herein, the concurrently reproduced condition is a condition that accepts the adjustment of the sound volume by the operation with respect to the adjustment knob in an ON state of a power source of the audio section 10 and a condition where the sound of the interrupt sound is reproduced, for example. In the case where it is determined by the operation condition determination part 94 that the operation of the adjustment knob has been started in a condition where only the sound of the media or only the interrupt sound is reproduced, the control part 96 places priority on the sound which is reproduced, as the control object.

However, the control part 96 prohibits switching of the control object of the sound volume by operation of the operating part 92 even when the sound source to be reproduced is changed while it is determined by the operation condition determination part 94 that the operation of the operating part 92 is continuously performed. Hereinafter, concrete processing will be explained.

[Concrete Processing 1]

Figure 2:
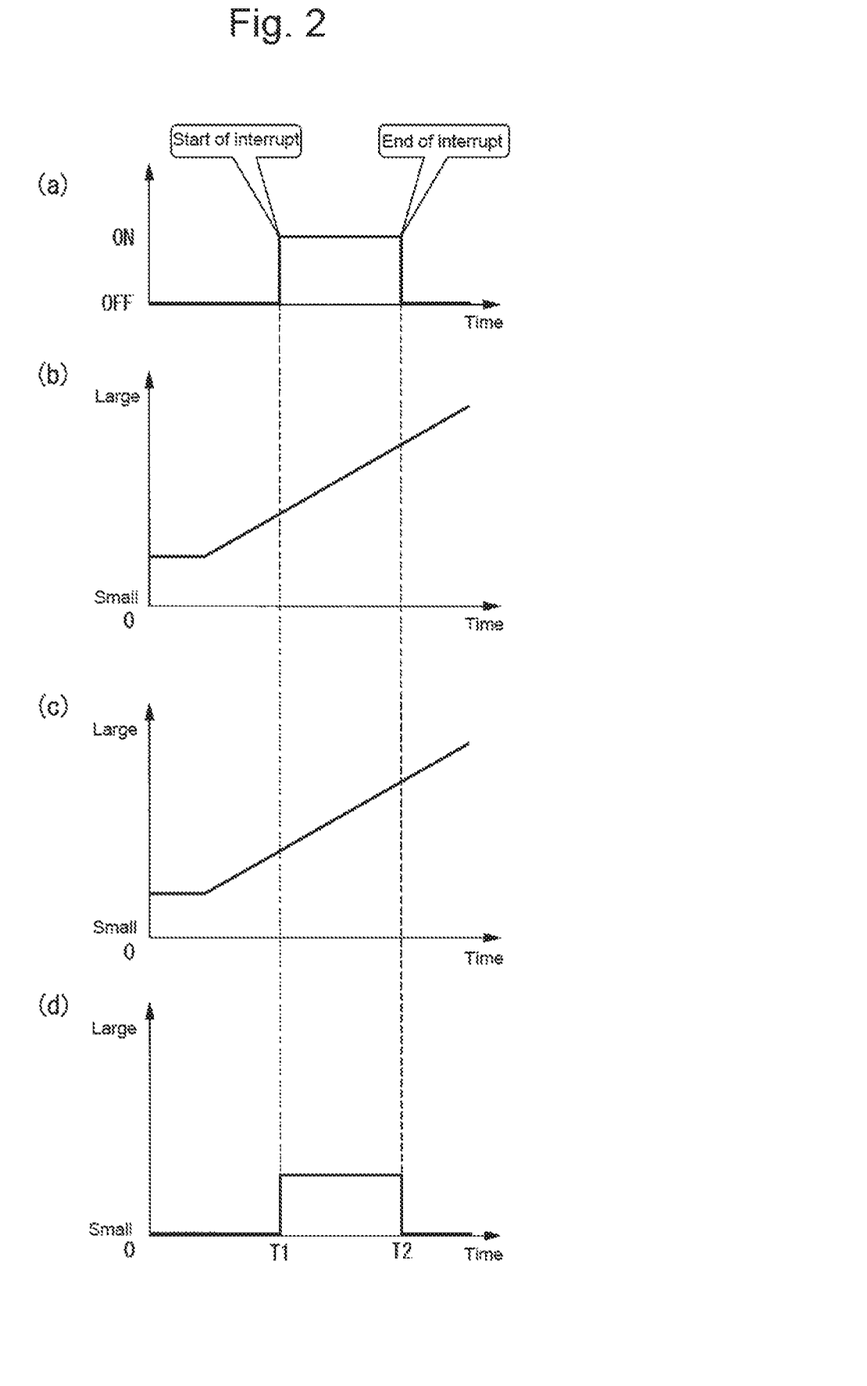
FIG. 2 is a diagram showing a change in output of a sound and operation of an operating element 92.

The processing in the case where the operation with respect to the adjustment knob which is performed has not been interrupted when the interrupt sound has been outputted will be explained. FIG. 2 is a diagram showing a change in the output of the sound and the operation of the operating part 92. An illustrated example shows a condition at the time the operation has been performed in an adjustable state of the volume of the media sound. The adjustable state of the volume of the media sound includes a state in which the media sound is actually outputted and a state in which the media sound is not outputted.

FIG. 2(a) is a diagram showing existence or nonexistence of the interrupt sound. A vertical axis of FIG. 2(a) shows the ON state (ON) of the interrupt sound or an OFF state (OFF) of the interrupt sound. The ON state of the interrupt sound is a state in which the interrupt sound is outputted, for example. A transverse axis of FIG. 2(a) shows time. Similarly, transverse axes of FIGS. 2(b) to 2(d) to be referred to later show time. FIG. 2(b) is a diagram showing the operation condition of the adjustment knob. A vertical axis of FIG. 2(b) shows a degree of operation with respect to a reference position (zero).

FIG. 2(c) is a diagram showing a change in the volume of the media sound. A vertical axis of FIG. 2(c) shows the sound volume with respect to a reference sound volume (zero). FIG. 2(d) is a diagram showing a change in the volume of the interrupt sound. A vertical axis of FIG. 2(d) shows the sound volume with respect to a reference sound volume (zero).

For example, as shown in FIG. 2(a), the interrupt sound is in the ON state from the time T1 to the time T2. In this case, when the adjustment knob is operated in such a manner that the sound volume is increased continuously from a stage before the time T1 and at a stage after the time T2 as shown in FIG. 2(b), the volume of the media sound is changed so as to be increased as shown in FIG. 2(c). In other words, as shown in FIG. 2(d), in the case where the interrupt sound is in the ON state and the adjustment knob is operated from a stage before the interrupt sound becomes the ON state, the volume of the media sound is adjusted without switching the object of the operation.

As referred to above, in the case where the adjustment knob is operated continuously when the interrupt sound is outputted, the operator adjusts the volume of the media sound with the intension of adjusting the volume of the media sound. Like this, the acoustic system 1 is configured so as to perform the control reflecting the intention of the operator.

[Concrete Processing 2]

Figure 3:
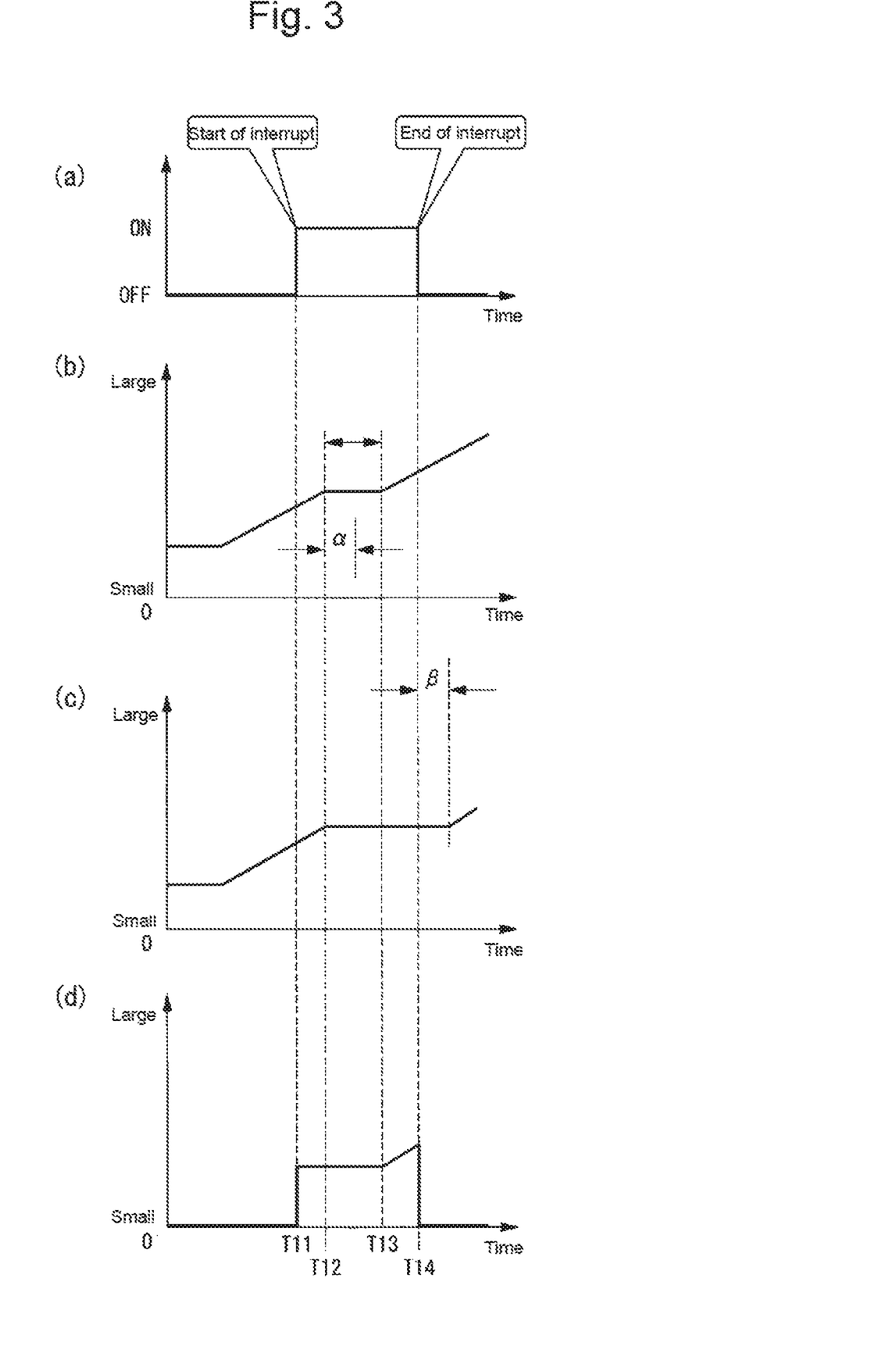
FIG. 3 is a diagram showing a change in the output of the sound and the operation of the operating element 92.

The processing in the case where the operation with respect to the adjustment knob which is performed has been interrupted when the interrupt sound has been outputted will be explained. FIG. 3 is a diagram showing a change in the output of the sound and the operation of the operating part 92. An illustrated example shows a condition at the time the operation has been performed in an adjustable state of the volume of the media sound. Contents of graphs shown in FIGS. 3(a) to 3(d) are similar to the contents of the graphs shown in FIGS. 2(a) to 2(d) referred to above.

For example, as shown in FIG. 3(a), the interrupt sound is in the ON state from the time T11 to the time T14. This case rests on the premise that the adjustment knob is operated in such a manner that the sound volume is increased from a stage before the time T11 to the time T12 as shown in FIG. 3(b), and that the operation of the adjustment knob is interrupted during a period of time (period longer than threshold time α) from a point passing the time T12 to the time T13. Then, as shown in FIGS. 3(b) to 3(d), when the adjustment knob is operated again at the time T13, the volume of the interrupt sound becomes larger without changing the volume of the media sound. In other words, the operation of the adjustment knob is interrupted, and the object of the operation is switched to the interrupt sound after the elapse of the threshold time α.

Further, also at a stage after the time T14, when the operation with respect to the adjustment knob is continued and when threshold time β has passed after the interrupt sound is changed to the OFF state, the volume of the media sound is increased in accordance with the operation with respect to the adjustment knob. In other words, the switching of the operation object is prohibited until the threshold time β elapses after transition of the interrupt sound to the OFF state, and the switching of the operation object is permitted after the elapse of the threshold time β.

As referred to above, in the case where the operation which has been performed is interrupted after the interrupt sound is outputted and the operation is restarted after the elapse of the threshold time α, the operator switches the operation object from the media sound to the interrupt sound with the intention of adjusting the volume of interrupt sound. Moreover, in the case where the operation with respect to the adjustment knob is continued for an interval longer than the threshold time β after the output of the interrupt sound has ended, the operator switches the operation object from the interrupt sound to the media sound with the intension of adjusting the volume of the media sound. Like this, in the acoustic system 1, it is possible to perform the control reflecting the intention of the operator.

[Comparative Example]

Figure 4:
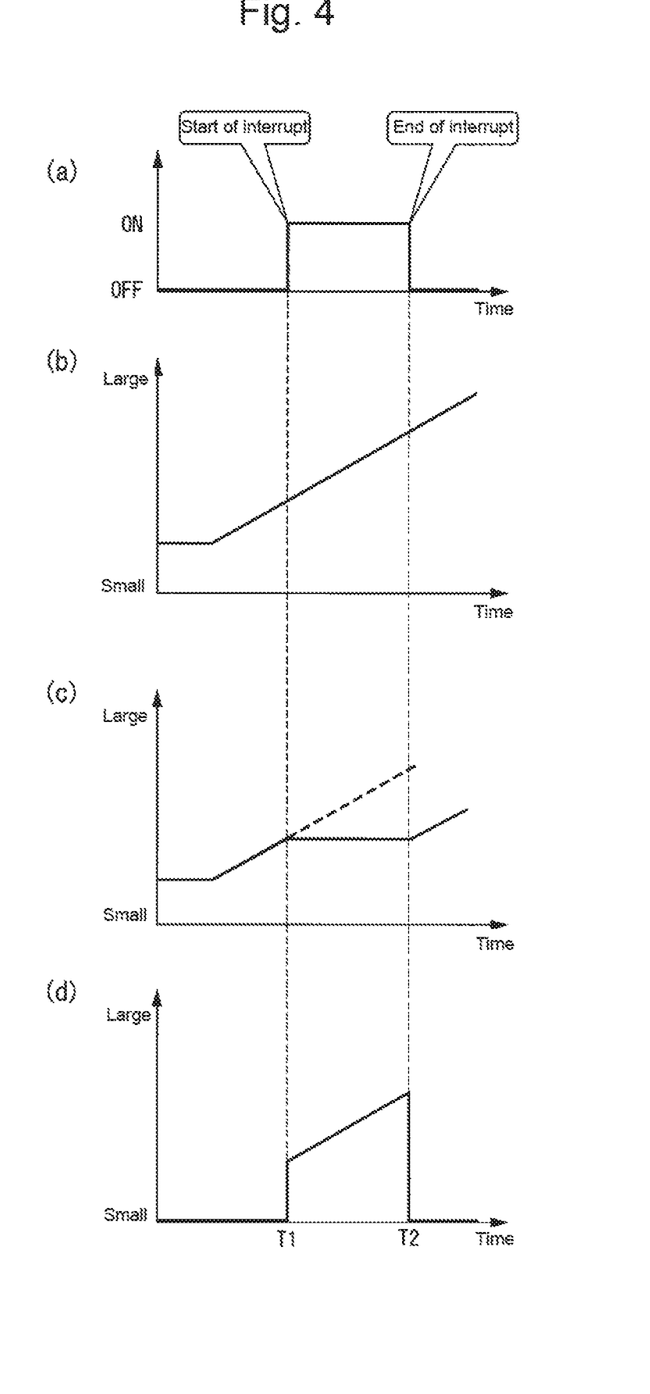
FIG. 4 is a diagram showing a change in the output of the sound and the operation of the operating element 92 of a comparative example.

FIG. 4 is a diagram showing a change in the output of the sound and the operation of the operating part of a comparative example. FIG. 4 shows processing in the case where the operation with respect to the adjustment knob which has been performed at the time the interrupt sound has been outputted as explained with reference to FIG. 2 referred to above, has not been interrupted.

When the adjustment knob is operated in such a manner that the sound volume is increased continuously from a stage before the time T1 and at a stage after the time T2 as shown in FIG. 4(b), the volume of the interrupt sound is changed so as to be increased as shown in FIG. 4(c). In other words, as shown in FIG. 4(d), in the case where the interrupt sound is in the ON state and the adjustment knob is operated from a stage before the interrupt sound becomes the ON state, the operation object is changed at the same time that the interrupt sound becomes the ON state irrespective of the intention of the operator.

In the comparative example, there may be cases where the volume of the interrupt sound is adjusted due to the switching of the operation object even when the operator has the intention of adjusting the volume of the media sound. Like this, in the acoustic system of the comparative example, the switching of the object of the adjustment operation is not necessarily performed at the appropriate timing, and there may be cases where the control different from the intention of the operator is performed. In other words, there may be cases where the control reflecting the intention of the operator is not able to be performed.

On the contrary, in the acoustic system 1 of this embodiment, the output of the media sound is increased without switching the operation object in the case where the operation is continued even when the interrupt sound has been outputted. As a result, it is possible to perform the control reflecting the intention of the operator.

[Flow Chart]

Figure 5:
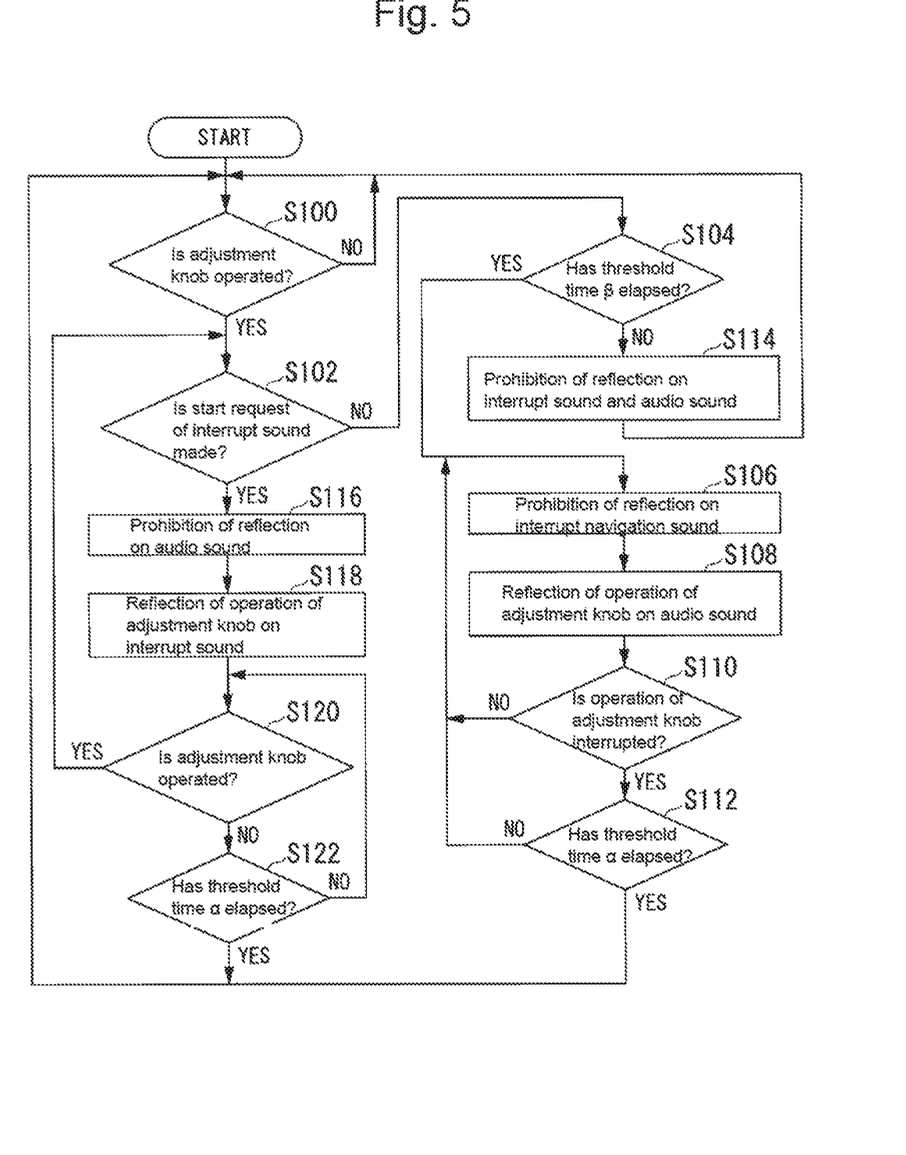
FIG. 5 is a flow chart showing a flow of processing to be executed by the acoustic system 1.

FIG. 5 is a flow chart showing a flow of processing to be executed by the acoustic system 1. This flow chart is a flow chart corresponding to the output of the sound and the operation of the operation part explained in FIG. 3 referred to above.

First, the operation condition determination part 94 determines whether or not the operation knob has been operated (Step S100). Specifically, this state is maintained until the operation is started from an initial state. When the operation knob is operated, the control part 96 determines whether or not a start request of the interrupt sound exists (Step S102).

The start request of the interrupt sound is a signal for requesting the control unit 90 to execute the output of the interrupt sound which is outputted by the navigation sound section 50.

When the start request of the interrupt sound does not exist, the control part 96 determines whether or not the threshold time β has elapsed (Step S104). When the threshold time β does not elapse, the control part 96 prohibits the operation with respect to the adjustment knob from reflecting the interrupt sound and the audio sound (Step S114).

When the threshold time β elapses, the control part 96 prohibits the operation with respect to the adjustment knob from reflecting the interrupt sound (Step S106) and allows the operation with respect to the adjustment knob to reflect the audio sound (Step S108). In other words, the control part 96 prohibits the control of the volume with respect to the interrupt sound and the media sound until the threshold time β (the second predetermined time) elapses after the end of the interrupt sound in the case where it is determined by the operation condition determination part 94 that the operation of the adjustment knob has been started during the reproduction of the interrupt sound and it is determined that the interrupt sound has ended while the operation of the adjustment knob is continuously performed. Further, the control part 96 cancels prohibition of the switching of the control object when the threshold time β has elapsed after the end of the interrupt sound even when it is determined by the operation condition determination part 94 that the operation of the adjustment knob is not interrupted. The above referred processing is a processing corresponding to the operation and control state before the time T11 in FIG. 3.

Next, the control part 96 determines whether or not the operation with respect to the adjustment knob has been interrupted (Step S110). When the operation with respect to the adjustment knob is not interrupted, the processing proceeds to Step S106. For example, the operation object is not switched in the case where the operation with respect to the adjustment knob is continued even when the interrupt sound is outputted during a period of time such as between the time T11 and the time T12 of FIG. 3 at that time.

When the operation with respect to the adjustment knob has been interrupted, the control part 96 determines whether or not the threshold time α has elapsed (Step S112). When the threshold time α does not elapse, the processing proceeds to Step S106, and when the threshold time α has elapsed, the processing proceeds to Step 100. As referred to above, the control part 96 determines that the operation with respect to the adjustment knob is continued during the period of time from the interruption of the operation of the adjustment knob by the operation condition determination part 94 to the elapse of the threshold time α (the first predetermined time), so that it prohibits the switching of the control object.

Herein, the processing from Step S106 to Step S112 will be summarized. The processing from Steps S106 to Step S110 is repeated while the operation of the adjustment knob with respect to the audio sound is continued. During this repeating period, the control object with respect to the operation of the adjustment knob is fixed to the audio sound. On the contrary, when the operation with respect to the adjustment knob is interrupted in Step S110 and the threshold time α has elapsed in Step S112, the repetition of the processing from Step S106 to Step S110 ends. Then, the processing returns to Step S100.

The operation condition determination part 94 determines whether or not the adjustment knob has been operated (Step S100). When the adjustment knob is operated, the control part 96 determined whether or not the interrupt sound is outputted (Step S102). When the start request of the interrupt sound is made, the control part 96 prohibits the operation with respect to the adjustment knob from reflecting the audio sound (Step S116). Next, the control part 96 allows the operation with respect to the adjustment knob to reflect the interrupt sound (Step S118).

The above referred processing (Steps S102, S116 and S118) is the processing to be performed during the period from the time T13 to the time T14 in FIG. 3 referred to above.

Next, the control part 96 determines whether or not the operation with respect to the adjustment knob is performed (Step S120). When the operation with respect to the adjustment knob is performed, the processing proceeds to Step S102. When the operation with respect to the adjustment knob is not performed, the control part 96 determines whether or not the threshold time α has elapsed (Step S122). When the threshold time α has not elapsed, the processing returns to Step S120. When the threshold time α has elapsed, the processing returns to Step S100.

Herein, the processing from Step S116 to Step S122 will be summarized. The processing from Steps S116 to Step S120 is repeated while the ON state of the interrupt sound is continued and the operation of the adjustment knob is continued. During this repeating period, the control object with respect to the operation of the adjustment knob is fixed to the interrupt sound. On the contrary, when the operation with respect to the adjustment knob is interrupted in Step S120 and the threshold time α has elapsed in Step S122, the repetition of the processing from Step S116 to Step S120 ends. Then, the processing returns to Step S100.

Further, when the output of the interrupt sound has ended (Step S102: "NO") while the operation with respect to the adjustment knob is continuously performed (while the processing from Step S116 to S120 is repeated), the repetition of the processing from Step S116 to Step S120 ends, and the processing proceeds to Step S104. As referred to above, one processing routine of this flow chart ends.

Further, in the case where the adjustment knob has been operated when the interrupt sound is outputted, the processing of Steps S100, S102 and S116 through S122 is performed in the above referred flow chart.

When the above referred processing is executed, the control reflecting the intention of the operator can be performed.

According to the above explained first embodiment, since the control part 96 prohibits the switching of the control object of the sound volume by the operation of the operating part 92 even when the sound source to be reproduced is changed while it is determined by the operation condition determination part 94 that the operation of the operating part 92 is continuously performed, the operation intended by the operator can be performed.

<Second Embodiment>

A second embodiment will be described. In the second embodiment, the interrupt sound is outputted or the output thereof stands by based on the degree of priority of the interrupt sound corresponding to the start request in the case where the start request of the interrupt sound has been made during adjustment of the volume of the audio sound. Hereinafter, the difference from the first embodiment will be mainly explained.

Figure 6:
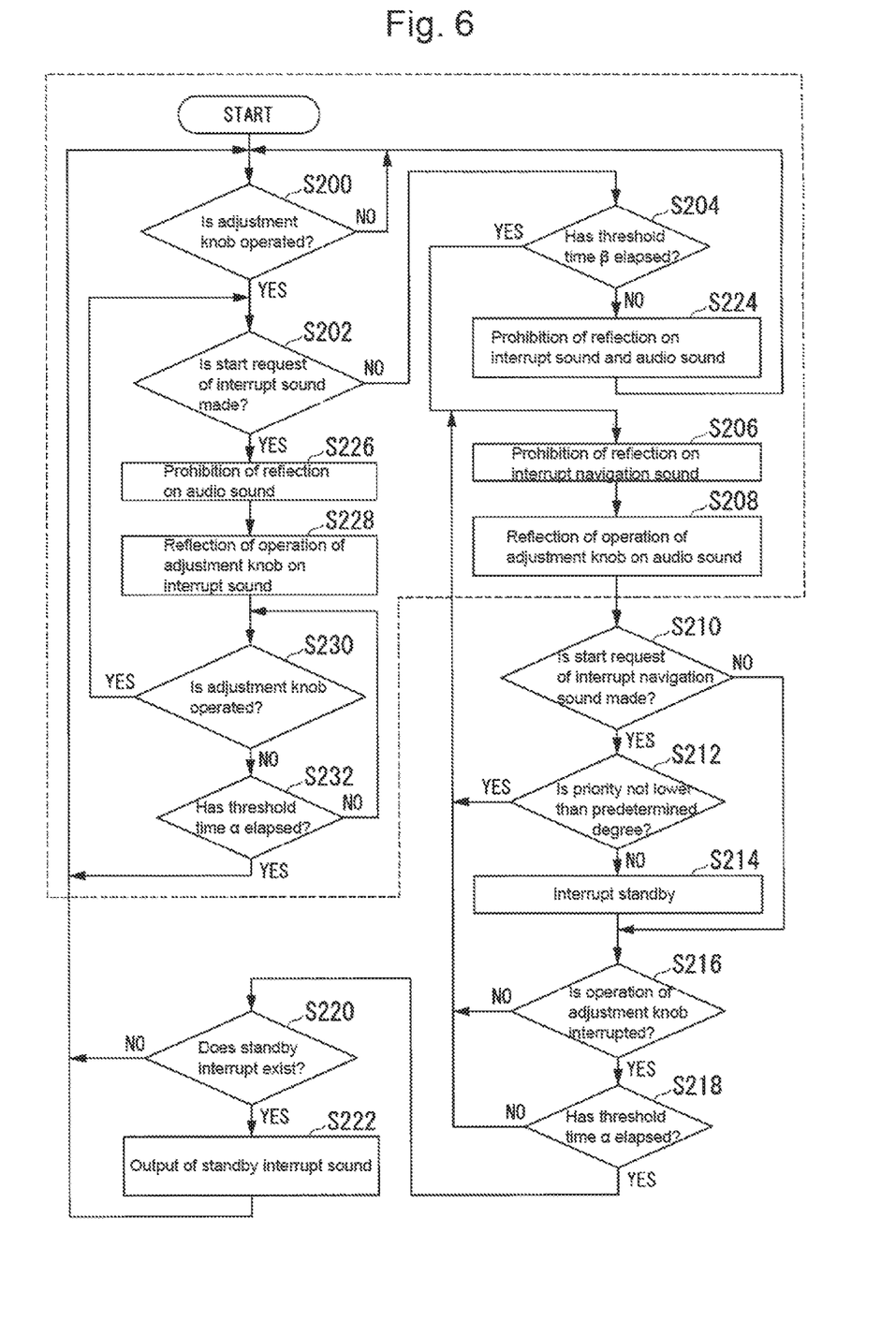
FIG. 6 is a flowchart showing the flow of the processing to be executed by the acoustic system 1 in accordance with a second embodiment.

FIG. 6 is a flowchart showing the flow of the processing to be executed by the acoustic system 1 in accordance with a second embodiment. Since the processing of Steps S200 to S208 and Steps S224 to S232 of FIG. 6 is identical to the processing of Steps S100 to S108 and Steps S114 to S122 of FIG. 5, the explanation will be omitted.

After the processing of Step S208, the control part 96 determines whether or not the start request of the interrupt sound is made (Step S210). When the start request of the interrupt sound has been made, the control part 96 determines whether or not the degree of priority of the interrupt sound is not lower than a predetermined degree (Step S212). The degree of priority corresponding to the interrupt sound is given to the request of the interrupt sound. The degree of priority of the interrupt sound is given to the interrupt sound, and the degree of priority and the interrupt sound are associated with each other and stored in a storage device of the control unit 90. The control part 96 determines whether or not the degree of priority is not lower than the predetermined degree based on information stored in the storage device.

The interrupt sound whose degree of priority is not lower than the predetermined degree is a sound which shows the occupant a route to a destination (a sound showing a branch guide) or a sound relating to behavior of the vehicle, for example. On the contrary, the interrupt sound whose degree of priority is lower than the predetermined degree is a sound which gives notice of the charge used in the ETC or a notification which has low relevance to the behavior of the vehicle, for example.

Further, in the case where the acoustic system 1 is applied in a state of being mounted on an automatic drive vehicle, the interrupt sound whose degree of priority is not lower than the predetermined degree may be a sound which notifies the occupant of the automatic drive. This sound is the notification which requests the occupant to hold (operate) a steering wheel or the notification which gives notice of the behavior (acceleration and deceleration, turn, stop or the like) of the vehicle to be performed in the automatic drive, for example.

When the degree of priority is equal to or above the predetermined degree, the interrupt sound is outputted, and the processing returns to Step S206. When the degree of priority is below the predetermined degree, the control part 96 puts the output of the interrupt sound on standby (Step S214), and the processing proceeds to S216. The control part 96 puts the output of the interrupt sound on standby while it is determined by the operation condition determination part 94 that the operation of the adjustment knob is performed continuously in the case where the control part 96 has determined that the start request of the interrupt sound has been outputted during controlling the volume of the media sound.

When the start request of the interrupt sound is not made in the processing of Step S210, the control part 96 determines whether or not the operation of the adjustment knob has been interrupted (Step S216). When the operation of the adjustment knob has not been interrupted, the processing proceeds to Step S206.

When the operation of the adjustment knob has been interrupted, the control part 96 determines whether or not the threshold time α has elapsed (Step S218). When the threshold time α has not elapsed, the processing returns to Step S206. When the threshold time α has elapsed, the control part 96 determines whether or not the interrupt sound in an output standby state exists (Step S220). When the interrupt sound in the output standby state does not exist, the processing proceeds to Step S200. When the interrupt sound in the output standby state exists, the control part 96 outputs the standby interrupt sound to the speaker 82 (Step S222). Then, one processing routine of this flow chart ends.

When the above referred processing is executed, it is possible to prevent the control different from the intention of the operator from being performed.

According to the second embodiment referred to above, when the control part 96 has determined that the interrupt of the interrupt sound has generated during controlling the volume of the media sound, the control part puts the output of the interrupt sound on standby while it is determined by the operation condition determination part 94 that the operation of the adjustment knob is performed continuously, so that it is possible to prevent the control different from the intention of the operator from being performed.

Herein, in the above referred embodiments, although the explanation has been made on the assumption that the sound source includes the predetermined media sound and the interrupt sound by the predetermined apparatus, the sound source is not limited to these and may include a first classification sound and a second classification sound. For example, the first classification sound may be "the media sound", and the second classification sound may be "the sound relative to the automatic drive". "The sound relative to the automatic drive" is a sound indicating the behavior of the vehicle which is performed in the automatic drive. Further, the first classification sound may be "the interrupt sound".

While the embodiments for embodying the present invention have been explained, the present invention is not limited to the above referred embodiments, and it is understood that various changes and modifications may be made in the invention without departing from the spirit or scope of the invention.

The invention claimed is:

1. An acoustic system comprising:
a sound reproduction device configured to reproduce sounds from a plurality of sound sources;
an operating element operable by an operator to set a sound volume of the sounds reproduced from the sound reproduction device for performing sound volume control;
an operation condition determinator configured to determine an operation condition of the operating element as to whether or not the operating element is operated by the operator; and
a controller configured to change a control object for the sound volume control by the operating element to be applied to any one of the sounds, in accordance with selection of the sound source to be reproduced by the sound reproduction device, and based on the operation condition determined by the operation condition determinator,
wherein the controller is further configured to prohibit the changing of the control object for the sound volume control between the sounds when it is determined by the operation condition determinator that the operating element is continuously operated by the operator even when the selection of the sound source is changed,
wherein the sound sources comprise a media player and a guiding message player,
wherein when both of sounds from the media player and the guiding message player are reproduced, the controller applies the sound volume control by the operating element to a guiding message sound from the guiding message player in a case where it is determined by the operation condition determinator that the operation of the operating element has been started during the reproduction of both of the sounds from the media player and the guiding message player, and
wherein when either of the sound from the media player or the guiding message sound from the guiding message player is reproduced, the controller applies the sound volume control by the operating element to the sound which is reproduced, in a case where it is determined by the operation condition determinator that the operation of the operating element has been started during the reproduction of the sound being reproduced.

2. The acoustic system according to claim 1, wherein the controller determines that the operating element is in the condition that it is continuously operated by the operator even when an operation of the operating element is detected, but a first predetermined time has not elapsed since the detection of the operation of the operating element.

3. An acoustic system comprising:
a sound reproduction device configured to reproduce sounds from a plurality of sound sources;
an operating element operable by an operator to set a sound volume of the sounds reproduced from the sound reproduction device for performing sound volume control;
an operation condition determinator configured to determine an operation condition of the operating element as to whether or not the operating element is operated by the operator; and
a controller configured to change a control object for the sound volume control by the operating element to be applied to any one of the sounds, in accordance with selection of the sound source to be reproduced by the sound reproduction device, and based on the operation condition determined by the operation condition determinator,
wherein the controller is further configured to prohibit the changing of the control object for the sound volume control between the sounds when it is determined by the operation condition determinator that the operating element is continuously operated by the operator even when the selection of the sound source is changed,
wherein the sound sources comprises a media player and a guiding message player, and
wherein when the controller prohibits the control of the sound volume with respect to a guiding message sound from the guiding message player and the sound of the media player until a second predetermined time elapses after the guiding message sound ends in a case where it is determined by the operation condition determinator that the operation of the operating element has been started during the reproduction of the guiding message sound and it is determined that the guiding message sound has ended while the operation of the operating element is continuously performed, and cancels the prohibition of the switching of the control object even when it is determined by the operation condition determinator that the operation of the operating element is not stopped, after the second predetermined time has elapsed after the end of the guiding message sound.

4. The acoustic system according to claim 1, wherein the controller puts output of the guiding message sound on standby while it is determined by the operation condition determinator that the operating element is continuously operated, in a case where it is determined that the guiding message sound has been started during controlling of the sound volume of the sound from the media player by the operator.

5. The acoustic system according to claim 4, wherein the controller selects whether or not to put the guiding message sound on standby in accordance with a degree of priority assigned to the generated guiding message sound.

6. A volume adjustment method for an acoustic system which comprises: a sound reproduction device configured to reproduce sounds from a plurality of sound sources; an operating element operable by an operator to set a sound volume of the sounds reproduced from the sound reproduction device for performing sound volume control; an operation condition determinator configured to determine an operation condition of the operating element as to whether or not the operating element is operated by the operator; and a controller configured to change a control object for the sound volume control by the operating element to be applied to any one of the sounds, in accordance with selection of the sound source to be reproduced by the sound reproduction device, and based on the operation condition determined by the operation condition determinator, the sound sources comprising a media player and a guiding message player, the method comprising:

prohibiting the changing of the control object for the sound volume control between the sounds when it is determined by the operation condition determinator that the operating element is continuously operated by the operator even when the selection of the sound source is changed;

applying the sound volume control by the operating element to a guiding message sound from the guiding message player, when both of sounds from the media player and the guiding message player are reproduced in a case where it is determined by the operation condition determinator that the operation of the operating element has been started during the reproduction of both of the sounds from the media player and the guiding message player; and applying the sound volume control by the operating element to the sound which is reproduced, when either of the sound from the media player or the guiding message sound from the guiding message player is reproduced in a case where it is determined by the operation condition determinator that the operation of the operating element has been started during the reproduction of the sound being reproduced.

* * * * *